United States Patent [19]

Kirschner

[11] 4,443,872
[45] Apr. 17, 1984

[54] VIDEO DISC PLAYER HAVING CADDY LOCKOUT MECHANISM

[75] Inventor: Thomas F. Kirschner, Indianapolis, Ind.

[73] Assignee: RCA Corporation, New York, N.Y.

[21] Appl. No.: 374,462

[22] Filed: May 3, 1982

[51] Int. Cl.³ .............................................. G11B 1/00
[52] U.S. Cl. ..................................... 369/77.2; 369/79
[58] Field of Search ............................ 369/75, 77, 79

[56] References Cited

U.S. PATENT DOCUMENTS 4,226,424 10/1980 Gordon .............................. 369/77.2
4,239,108 12/1980 Coleman et al. .................... 369/77.2

FOREIGN PATENT DOCUMENTS 2098380 11/1982 United Kingdom ............... 369/77.2

*Primary Examiner*—Steven L. Stephan
*Attorney, Agent, or Firm*—E. M. Whitacre; J. S. Tripoli; D. A. Kulkarni

[57] ABSTRACT

A caddy-type player has a pair of spring-loaded lockout members disposed at the opposite ends of the caddy input slot. The lockout members are positioned inside and outside the caddy insertion path, respectively, in response to the presence of and the absence of a record/spine assembly inside the player. The lockout members have square edges and sloping edges which are, respectively, disposed perpendicularly and non-perpendicularly to the caddy insertion path when the lockout members are positioned in the caddy insertion path. When an empty caddy sleeve is inserted into the player to retrieve a retained record/spine assembly, its leading edges engage the respective sloping edges of the lockout members to position the lockout members outside the caddy insertion path. If a full caddy is inserted into the player, while it already has another record/spine assembly inside, the square edges of the lockout members engage the leading edge of the full caddy to prevent it from going in.

9 Claims, 15 Drawing Figures

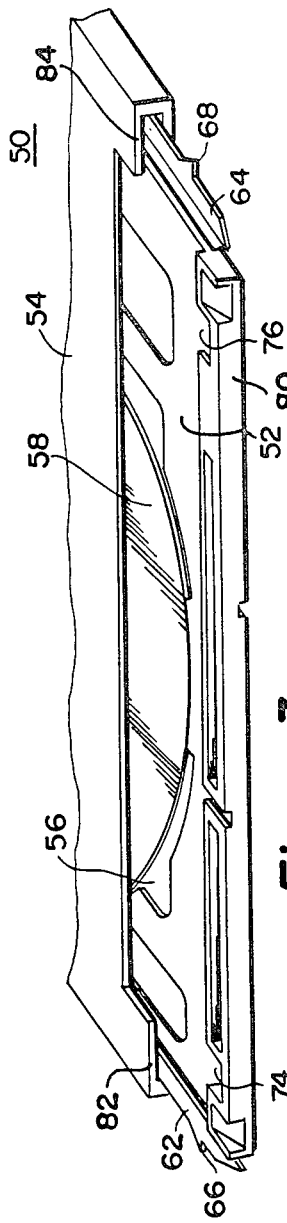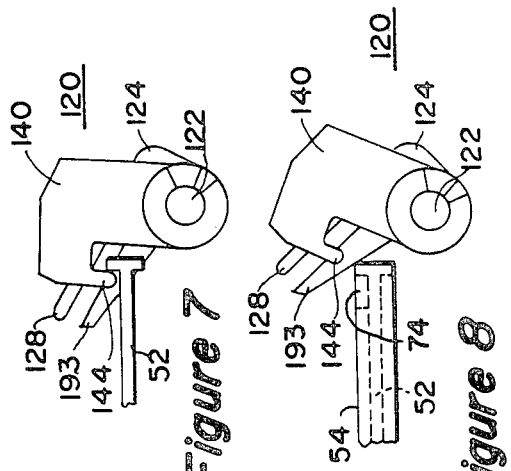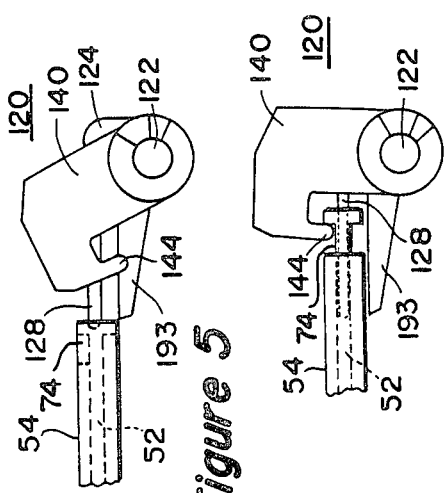

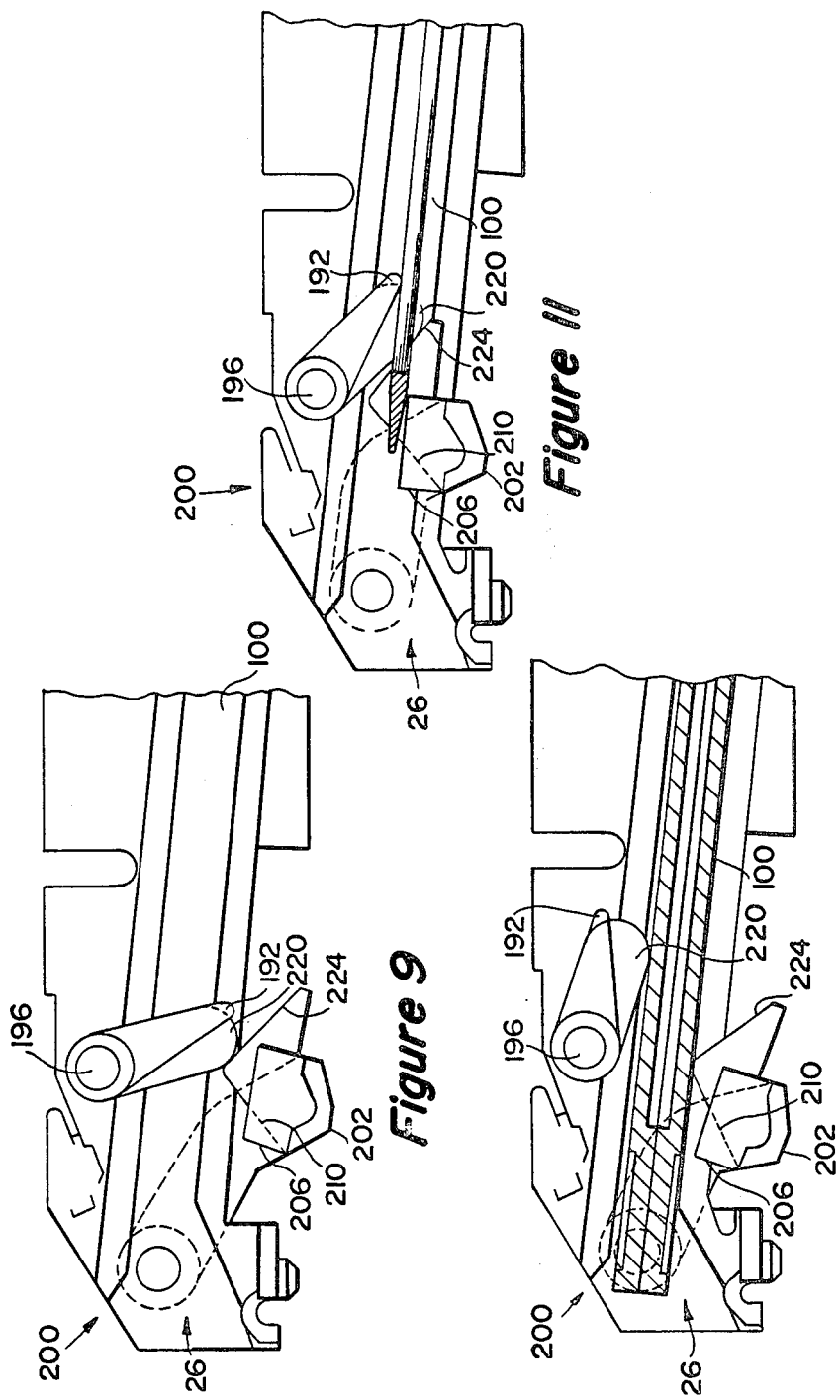

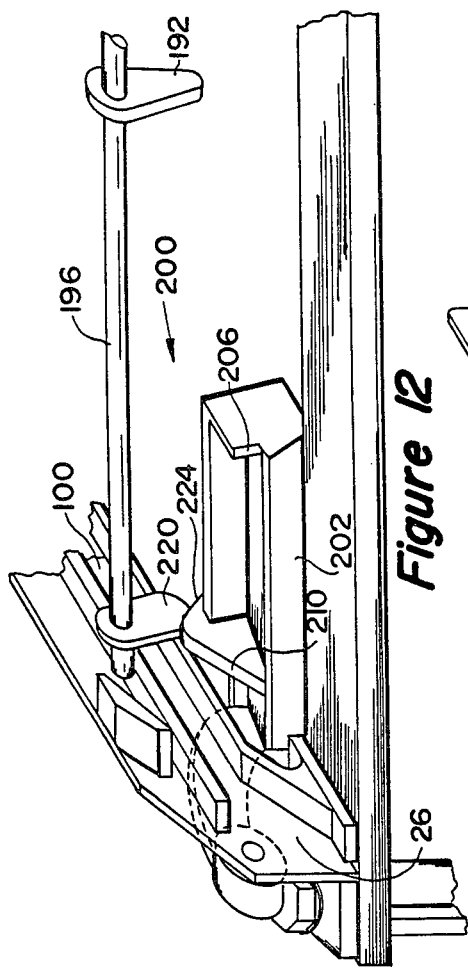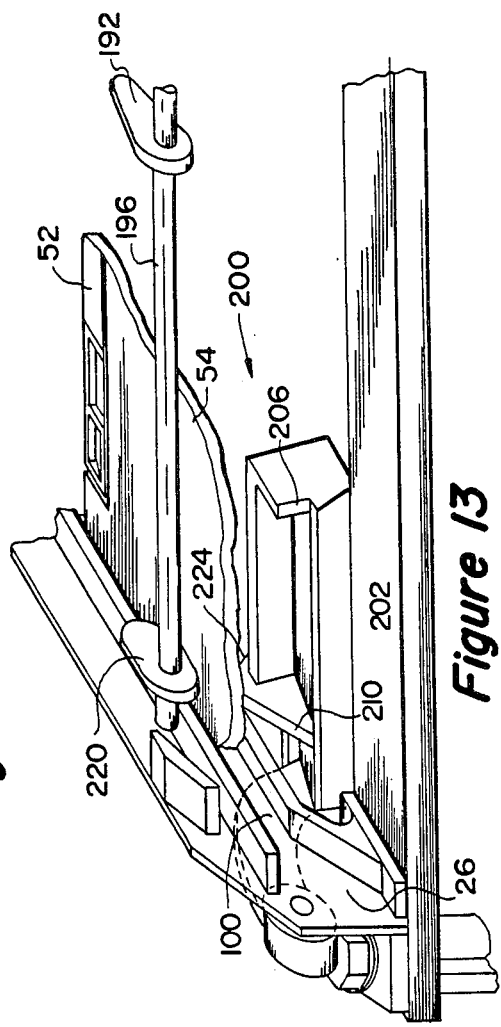

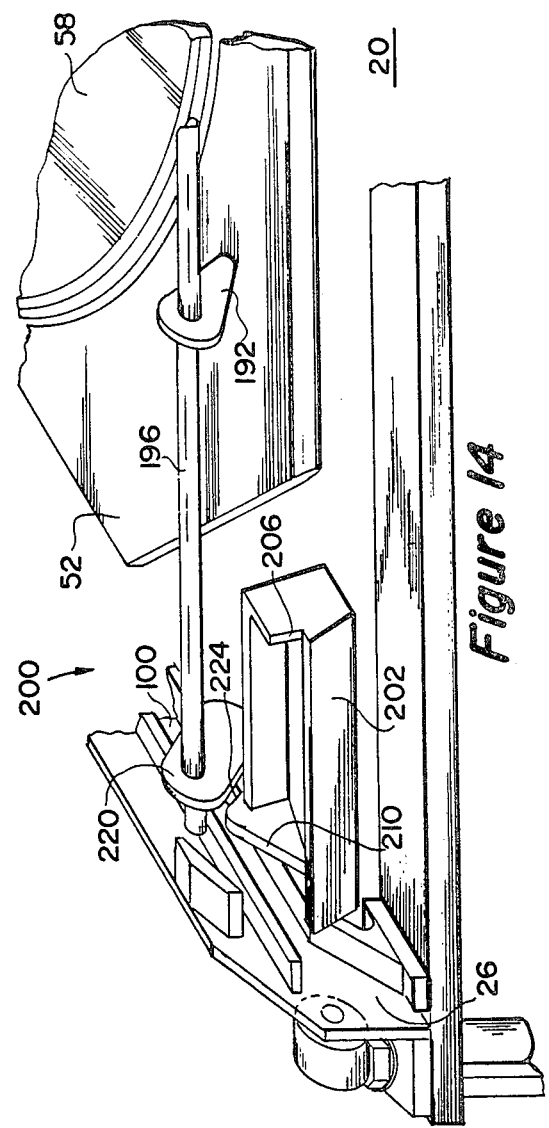
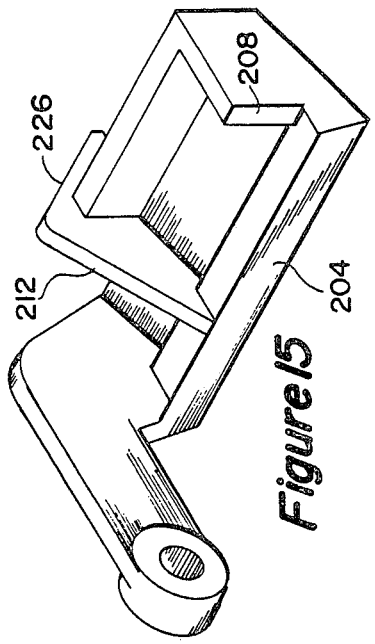

VIDEO DISC PLAYER HAVING CADDY LOCKOUT MECHANISM

This invention generally relates to a record playback system, and more particularly, it concerns a record player in which a record enclosed in a protective caddy is loaded into the player while the record remains enclosed in its caddy.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitance variations are converted into electrical signals suitable for application to a conventional television receiver.

It is beneficial to enclose a video record in a caddy which comprises a record retaining spine removably located within an outer sleeve. The record retaining spine has an opening in which a record is received to form a record/spine assembly. The record retaining spine is provided with a pair of spaced apart locking fingers disposed at the opposite edges thereof to releasably secure the spine to the sleeve. For record loading, a full caddy is inserted into an input slot provided in the player along a path defined by a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred to the turntable for playback. For record retrieval, the record is transferred back to the receiving pads, and an empty sleeve is reinserted into the player to recapture the record/spine assembly.

In accordance with the subject invention, the player has a caddy lockout mechanism to prevent the insertion of a full caddy into the player while another record/spine assembly is already inside the player. The subject mechanism includes a lockout member yieldably mounted near the input slot in the player for motion between a first position in the caddy insertion path and a second position outside the caddy insertion path, respectively, in response to the presence of and the absence of a record/spine assembly inside the player. The lockout member has an inclined edge which is located such that the leading edge of an empty sleeve, reinserted into the player to retrieve the record/spine assembly, engages the inclined edge of the lockout member to position the lockout member outside the caddy insertion path in order to allow the insertion of the empty sleeve into the player. The lockout member is further equipped with a perpendicular edge arranged such that it engages the leading edge of a full caddy inserted into the input slot to prevent the full caddy from going further in, when another record/spine assembly is already inside the player.

According to another feature of this invention, a caddy lockout member is provided at each end of the input slot inside the player.

Pursuant to a still further feature of the instant invention, the caddy lockout mechanism includes a pair of spring-loaded actuating members which are located near the caddy input slot such that they position the respective lockout members outside the caddy insertion path in the absence of a record/spine assembly inside the player.

In accordance with still another feature of the present invention, the player is equipped with a pair of hold-down members for holding the spine against the receiving pads. The spine hold-down members and the actuating members are both fixedly mounted on a rotatable shaft located near the input slot so that when a full caddy is inserted into the player, the front edge of the caddy deflects the actuating members, the hold-down members, and the lockout members out of the caddy insertion path. When the sleeve is withdrawn, the hold-down members, in engagement with the retained spine, prevent the actuating members from returning to their respective original positions, thereby allowing the spring-loaded lockout members to return to their positions in the caddy insertion path.

In the Drawings:

FIG. 3 represents a partial perspective view of the front portion of the FIG. 2 video disc caddy;

FIGS. 5–8 depict the sequence of steps involved in loading and unloading a record;

FIGS. 9–11 show the operation of the instant caddy lockout mechanism;

FIGS. 12–14 are perspective views of the subject caddy lockout mechanism corresponding to FIGS. 9–11 respectively; and FIG. 15 is an isometric view of the lockout member of the present caddy lockout mechanism.

Figure 1:
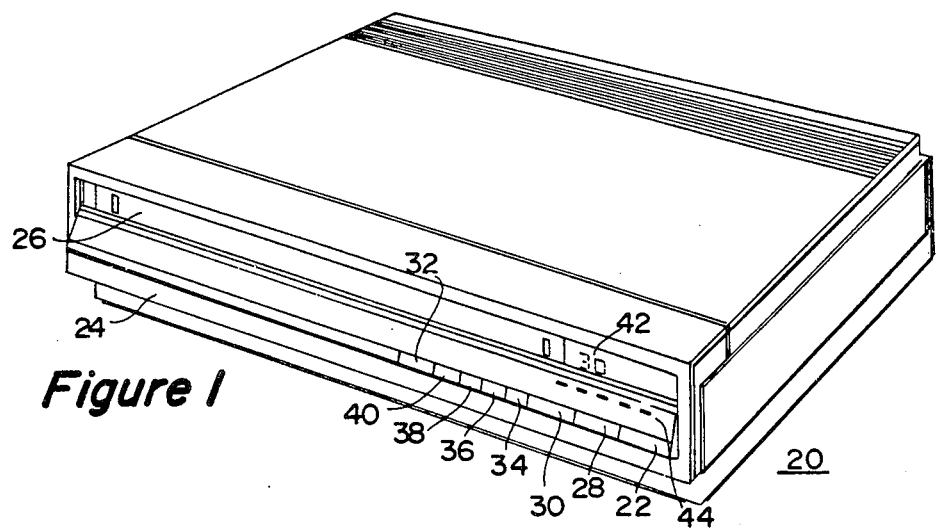
FIG. 1 is a video disc player incorporating a caddy lockout mechanism in accordance with the subject invention.
Figure 2:
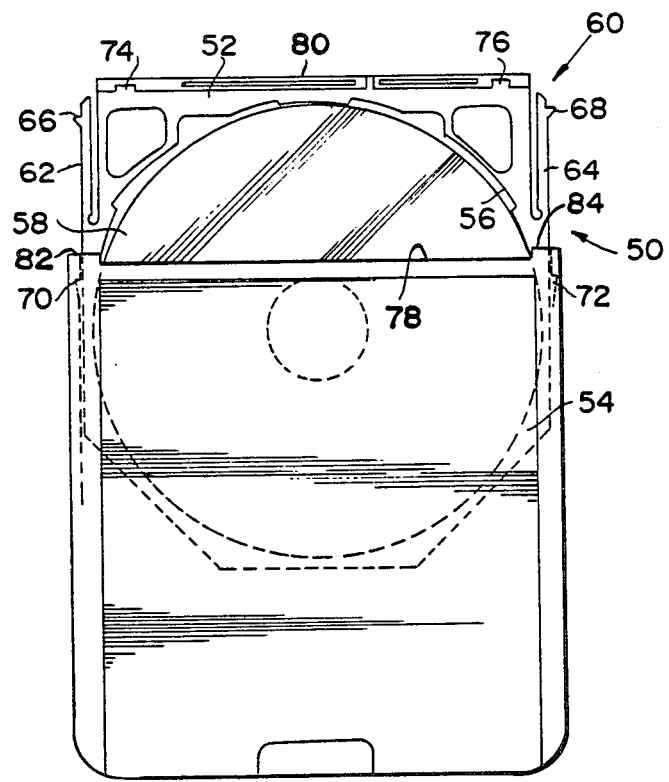
FIG. 2 shows a video disc caddy suitable for use with the present caddy lockout mechanism.
Figure 4:
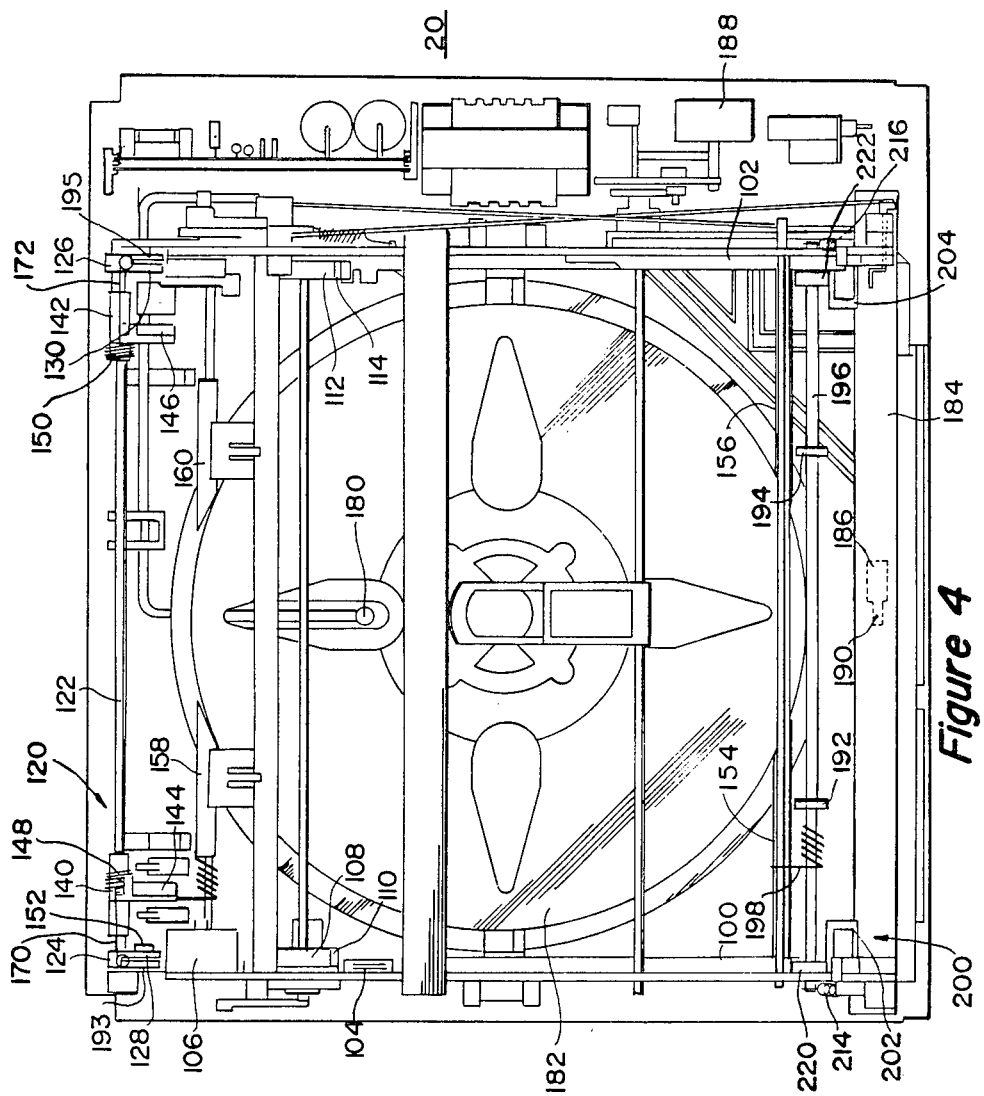
FIG. 4 illustrates a top view of the video disc player of FIG. 1 with its cover removed to show the underlying details.

Shown in FIG. 1 is a video disc player 20 incorporating the subject caddy lockout mechanism. To play a disc, the player is turned on by pressing the "POWER" button 22 located on the front panel 24. A loaded record caddy, illustrated in FIGS. 2 and 3, is inserted into the player through a caddy input slot 26, and the caddy sleeve is then extracted leaving the enclosed record inside the player. The record is automatically deposited on the turntable, and played back through a conventional television receiver. At any point during playback the viewer can reject the remainder of the record by depressing the "REJECT" button 28, or interrupt the program by activating the "PLAY/PAUSE" button 30. The player has a "CHANNEL SELECT" button 32 to select any one of two audio channels in the event of a bilingual program disc. Buttons 34, 36, 38 and 40 permit the user to visually search the record in either direction at two different speeds (e.g., 16 and 120 times the normal playback speed). An LED indicator 42 shows the elapsed playing time. Various player functions—such as SIDE 1-2, CHANNEL A-B, STEREO—are indicated by a plurality of light indicators 44.

The caddy 50, depicted in FIGS. 2 and 3, consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 62 and 64 for releasably securing the spine 52 in its sleeve 54. The spine locking fingers 62 and 64 have protruding elements 66 and 68 which are received in the respective recesses 70 and 72 in the sleeve 54 to hold the spine 52 in place. The spine 52 has cutouts 74 and 76 in which the respective spine latching members of the record extraction mechanism are received for reasons explained later. The front surface of the sleeve 54 has a recess 78 in which the leading portion 80 of the spine 52 is flushly received. The foremost edges 82 and 84 of the sleeve 54 and the leading edge 80 of the spine 52 together define a straight edge 86 upon the reception of the spine in the sleeve.

To load a record, the caddy 50 is manually inserted into the player through the input slot 26 along a pair of guide rails 100 and 102. When the caddy 50 actuates a caddy sense switch 104, a function motor 106 is turned on to drive a set of caddy drive rollers 108, 110, 112 and 114 which, in turn, pull the caddy in.

The player has a record extraction mechanism 120, shown in FIGS. 5-8, consisting of a cross shaft 122 pivotally mounted near the back end of the player at right angles to, and offset from, the caddy insertion path. Disposed at the opposite ends of the offset shaft 122, and fixedly secured thereto, are a pair of spine releasing members 124 and 126. The spine releasing members 124 and 126 are each equipped with the respective wedge-like portions 128 and 130 arranged in the caddy insertion path as indicated in FIG. 5. When the caddy 50 is inserted into the player, the leading edge of the caddy is transported to the rear end of the player, and the wedge-like portions 128 and 130 protrude into the sleeve 54 to deflect the spine locking fingers 62 and 64 in order to release the spine 52 from the sleeve.

The record extraction mechanism 120 further includes a pair of spring-loaded spine latching members 140 and 142 mounted freely on the cross shaft 122 adjacent to the respective spine releasing members 124 and 126. When the caddy 50 is driven into the player, the hook-like portions 144 and 146 of the spine latching members 140 and 142 engage the spine 52 as indicated in FIG. 6. A pair of coil springs 148 and 150, disposed about the offset shaft 122, drive the hook-like portions 144 and 146 into the slots 74 and 76 in the spine 52 to lock the spine to the player.

When the caddy 50 reaches the fully inserted position, it activates a microswitch 152 located at the back end of the player to reverse the function motor 106 to drive the sleeve 54 out until it clears the drive rollers 108, 110, 112 and 114. The sleeve 54 is then manually extracted, leaving the record/spine assembly 60 inside the player resting on a set of record receiving pads 154, 156, 158 and 160. When the sleeve 54 is withdrawn, a pair of springs 170 and 172, connecting the spine releasing members 124 and 126 and the spine latching members 140 and 142 together, rotate the spine releasing members away from the spine 52 as can be seen from FIG. 7.

A record handling mechanism 180 is then activated to transfer the retained record 58 from the receiving pads 154, 156, 158 and 160 to a turntable 182, and the turntable motor is turned on. A carriage 184, which houses a stylus cartridge 186, is then advanced by a motor 188 to a position over the turntable 182, and a stylus 190, located in the pickup cartridge, is lowered onto the record 58. During playback, the motor 188 drives the carriage 184 to follow the pickup stylus 190. At the end of the playback, the carriage drive motor 188 returns the carriage to its starting position. The record 58 is then returned to the receiving pads 154, 156, 158 and 160 by the record handling mechanism 180 to redefine the record/spine assembly 60.

To recapture the record/spine assembly 60 disposed on the receiving pads 154, 156, 158 and 160, an empty sleeve 54 is reinserted into the player. When the sleeve 54 engages the caddy sense switch 104, the function motor 106 drives the rollers 108, 110, 112 and 114 to draw in the sleeve. As the sleeve 54 reaches the fully inserted position in the player, its front edge engages and deflects the portions 193 and 195 disposed on the respective spine releasing members 124 and 126 as shown in FIG. 8. The spine releasing members 124 and 126, in turn, press against the respective spine latching members 140 and 142 to lift the hook-like portions 144 and 146 from the slots 74 and 76 in the spine 52 to release the spine. Simultaneously, the spine locking fingers 62 and 64 lock the spine 52 in its sleeve 54. The function motor 106 is then automatically reversed to drive the caddy 50 out until it clears the drive rollers 108, 110, 112 and 114. The caddy 50 is then manually removed from the player. The springs 148 and 150 reset the spine latching members 140 and 142, and the spine releasing members 124 and 126.

The player is equipped with a pair of hold-down members 192 and 194 fixedly mounted on a rotatable cross shaft 196 disposed near the input slot 26, and located above the caddy insertion path. When a full caddy 50 is inserted into the player, its leading edge deflects the hold-down members 192 and 194 against the force of a coil spring 198 disposed about the cross shaft 196. When the sleeve 54 is withdrawn, the spring 198 biases the hold-down members 192 and 194 against the retained spine 52 to hold the spine against the receiving pads 154 and 156. The spine 52 is held in place while the record handling mechanism 180 transfers the enclosed record to the turntable 182 for playback, and, thereafter, returns the record back to the receiving pads 154, 156, 158 and 160 to redefine the record/spine assembly.

As previously indicated, it is desirable to preclude the insertion of a full caddy into the player when a record/spine assembly 60 is already inside the player. The player must, however, receive an empty sleeve to permit it to recapture the retained record/spine assembly 60. To this end, the player is equipped with a caddy lockout mechanism 200 in accordance with this invention.

The subject caddy lockout mechanism 200, shown in FIGS. 9-15, consists of a pair of spring-loaded lockout members 202 and 204 pivotally mounted at the opposite ends of the input slot 26 for motion between a raised first position (FIG. 11) and a depressed second position (FIGS. 9 and 10) arranged, respectively, in and out of the caddy insertion path. The lockout members 202 and 204 are provided with square edges 206 and 208 and offset sloping edges 210 and 212 which are respectively disposed substantially perpendicularly and non-perpendicularly in respect of the caddy insertion path when the lockout members are occupying their raised positions in the caddy insertion path. A pair of springs 214 and 216 bias the respective lockout members 202 and 204 to occupy their raised positions.

Fixedly disposed on the spring-biased cross shaft 196, carrying the spine hold-down members 192 and 194, are a pair of actuating cams 220 and 222 which are located such that they engage the oppositely-disposed inclined portions 224 and 226 of the respective lockout members 202 and 204 to position them outside the caddy insertion path, as can be seen from FIGS. 9 and 12. The leading edge of the caddy 50, being inserted into the player to load a record therein, rotates the actuating cams 220 and 222 to their respective raised positions indicated in FIGS. 10 and 13. The actuating cams 220 and 222, in turn, raise the hold-down members 192 and 194 so that the caddy 50 can be inserted into the player. The walls of the caddy 50 keep the deflected lockout members 202 and 204 out of the caddy insertion path in the manner shown in FIGS. 10 and 13. When the sleeve 54 is extracted, the hold-down members 192 and 194, in engagement with the retained spine 52, prevent the actuating cams 220 and 222 from returning to their initial positions, thereby allowing the lockout members 202 and 204 to occupy their respective raised positions in the caddy insertion path as indicated in FIGS. 11 and 14.

When an empty sleeve 54 is inserted into the player to retrieve the record/spine assembly 60, its leading edges 82 and 84 engage the respective sloping edges 210 and 212 of the lockout members 202 and 204 to displace the lockout members outside the caddy insertion path. The caddy 50 is then extracted from the player. When the caddy 50 is withdrawn, the coil spring 198 restores the actuating members 220 and 222 to their initial positions shown in FIGS. 9 and 12. The actuating members 220 and 222, in turn, rotate the respective lockout members 202 and 204 to their positions outside the caddy insertion path, as can be seen from FIGS. 9 and 12.

However, if a full caddy is inserted into the player, while it already has a record/spine assembly inside in the manner shown in FIGS. 11 and 14, the square edges 206 and 208 of the lockout members 202 and 204 engage the leading edge of the caddy to prevent it from going in.

The relative locations of the square edges 206, 208 of the respective lockout members 202, 204 in relation to the sloping edges 210, 212 thereof are such that the foremost portions 82 and 84 of the empty sleeve 54 engage the respective sloping edges of the lockout members before the recessed portion 78 of the sleeve contacts the square edges of the lockout members, when the empty sleeve is inserted into the player to retrieve a retained record/spine assembly. The location of the forces exerted by the empty sleeve 54 on the sloping edges 210 and 212 of the pivotally-mounted lockout members 202 and 204 are such that the lockout members are deflected out of the caddy insertion path so that the empty sleeve can be inserted into the player to retrieve the retained record/spine assembly.

On the other hand, when the full caddy 50 is inserted into the player while another record/spine assembly is already inside the player, the leading edge 86 of the caddy engages the square edges 206 and 208 of the respective lockout members 202 and 204 occupying the caddy insertion path. The location of the forces exerted by the full caddy 50 on the pivotally-mounted lockout members 202 and 204 disposed in the caddy insertion path are such that the lockout members stay in the caddy insertion path preventing the full caddy from going further in.

It will be thus seen that the lockout members 202 and 204 allow an empty caddy to be inserted into the player, while preventing insertion of a full caddy into the player, when a record/spine assembly is inside the player.

What is claimed is:

1. In a disc record player for use with a record caddy; said caddy consisting of a record retaining spine removably located within an outer sleeve; said retaining spine and an associated record forming a record/spine assembly; said player having an input slot through which said caddy is inserted along a path to load a record therein; said player retaining said record/spine assembly when said sleeve is extracted from said player after the insertion of a full caddy therein; wherein an empty sleeve is reinserted into said player to recapture said record/spine assembly; an apparatus comprising:

a lockout member yieldably mounted near said input slot in said player occupying a first position in said caddy insertion path, and a second position outside said caddy insertion path, respectively, in response to the presence of and the absence of a record/spine assembly in said player;

said lockout member having a square edge and a sloping edge respectively disposed substantially perpendicularly and non-perpendicularly with respect to said caddy insertion path when said lockout member is occupying said first position in said caddy insertion path;

the location of said sloping edge being such that the front edge of an empty sleeve, reinserted into said player to retrieve said record/spine assembly, engages said sloping edge of said lockout member, occupying said first position thereof, to deflect said lockout member out of said caddy insertion path; and the location of said square edge being such that said square edge of said lockout member, disposed in said caddy insertion path in response to the presence of a record/spine assembly in said player; engages the front edge of a full caddy inserted into said player to preclude further caddy insertion.

2. The lockout apparatus set forth in claim 1 further including means for biasing said lockout member to occupy said first position thereof in said caddy insertion path.

3. The lockout apparatus defined in claim 2 further having an actuating member mounted in said player for motion between first location and a second location, respectively, in response to the presence of and the absence of a record/spine assembly in said player; said actuating member, when occupying said second location, keeping said lockout member out of said caddy insertion path against the force of said biasing means.

4. The lockout apparatus set forth in claim 3 further including means for urging said actuating member to occupy said second location, in the absence of a record/spine assembly in said player, to, in turn, cause said lockout member to occupy said position thereof outside said caddy insertion path.

5. The lockout apparatus defined in claim 4 wherein said player includes a set of receiving pads for supporting a record/spine assembly retained inside said player when said sleeve is withdrawn; said player further having a spine hold-down member fixedly mounted on a rotatable shaft located near said input slot for holding said retained spine against said receiving pads; said actuating member being fixedly disposed on said shaft such that when said hold-down member is in engagement with said retained spine, said actuating member is disposed at said first location thereof, thereby allowing said biasing means to position said lockout member in said caddy insertion path.

6. The apparatus defined in claim 1 wherein said lockout member is disposed near one end of said input slot; said apparatus further having a second lockout member located near the other end of said input slot; said second lockout member being subject to disposition at a first position in said caddy insertion path, and a second position outside said caddy insertion path, respectively, in response to the presence of and the absence of a record/spine assembly in said player; said second lockout member having a square edge and a sloping edge disposed substantially perpendicularly and non-perpendicularly in respect of said caddy insertion path when said second lockout member is arranged in said caddy insertion path; means for biasing said second lockout member to occupy said position thereof in said caddy insertion path; an empty sleeve, being reinserted into said player to recapture said record/spine assembly, engaging said sloping edge of said second lockout member to position it outside said caddy insertion path; said square edge of said second lockout member, being disposed in said caddy insertion path in response to the presence of said record/spine assembly in said player, engaging the front edge of a full caddy inserted into said player to lock said caddy out.

7. The apparatus set forth in claim 6 further having a pair of spaced apart actuating members fixedly mounted on a rotatable shaft located near said input slot for motion between a first location and a second location, respectively, in response to the presence of and the absence of a record/spine assembly in said player; the location of said actuating members being such that said actuating members engage the respective one of said lockout members to hold them outside said caddy insertion path when said actuating members are occupying said second location thereof.

8. The apparatus defined in claim 7 further including means for urging said actuating members to occupy said second location thereof, in the absence of a record/spine assembly in said player, to, in turn, cause said lockout members to occupy their respective positions outside said caddy insertion path.

9. The apparatus set forth in claim 8 wherein said player has a set of receiving pads for supporting a record/spine assembly retained inside said player when said sleeve is extracted therefrom; said player including a pair of spine hold-down members fixedly mounted on said rotatable shaft for holding said retained spine against said receiving pads; the relative angular orientation of said hold-down members and said actuating members on said shaft being such that when said hold-down members are in engagement with said retained spine, said actuating members are disposed at said first location thereof allowing said biasing means to restore said lockout members in said caddy insertion path.

* * * * *